(12) United States Patent
Endo

(10) Patent No.: US 6,817,779 B2
(45) Date of Patent: Nov. 16, 2004

(54) FERRULE FOR CONNECTOR OF OPTICAL FIBER AND METHOD OF WELDING FERRULE AND OPTICAL FIBER

(75) Inventor: Takashi Endo, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/453,593

(22) Filed: Jun. 4, 2003

(65) Prior Publication Data
US 2004/0008951 A1 Jan. 15, 2004

(30) Foreign Application Priority Data
Jul. 12, 2002 (JP) .................................. 2002-203689

(51) Int. Cl.$^7$ .................................................. G02B 6/36
(52) U.S. Cl. ........................................................ 385/78
(58) Field of Search ............................................. 385/78

(56) References Cited

U.S. PATENT DOCUMENTS 4,028,798 A * 6/1977 Bechard et al. ................ 29/838

FOREIGN PATENT DOCUMENTS

| EP | 0 784 219 | 7/1997 |
|---|---|---|
| EP | 0 803 751 | 10/1997 |
| GB | 2 040 062 | 8/1980 |
| GB | 2 340 622 | 2/2000 |
| JP | 56-16105 | 2/1981 |
| JP | 58-9114 | 1/1983 |
| JP | 63-137202 | 6/1988 |
| WO | WO 94/00785 | 1/1994 |

OTHER PUBLICATIONS

Copy of Great Britain Patent Office Action including search report for corresponding Great Britain patent application No. 0312711.5 dated Oct. 10, 2003.

* cited by examiner

Primary Examiner—Javaid H. Nasri
(74) Attorney, Agent, or Firm—Armstrong, Kratz, Quintos, Hanson & Brooks, LLP

(57) ABSTRACT

A ferrule for a connector of an optical fiber, which can be joined in short time with the optical fiber and can position the optical fiber securely, and a method of welding the ferrule and the optical fiber are provided. Projections 20 for contacting with a surface of an optical fiber 31 are disposed, preferably at equal intervals, along a circumferential direction of an inner wall 35b of a through hole 35a of a ferrule 35. By inserting the optical fiber 31 into the ferrule 35, and by heating and melting the projections 20 and an inner cover 33 of the optical fiber 31 by ultrasonic vibration, the optical fiber 31 and the ferrule 35 are joined together.

6 Claims, 3 Drawing Sheets

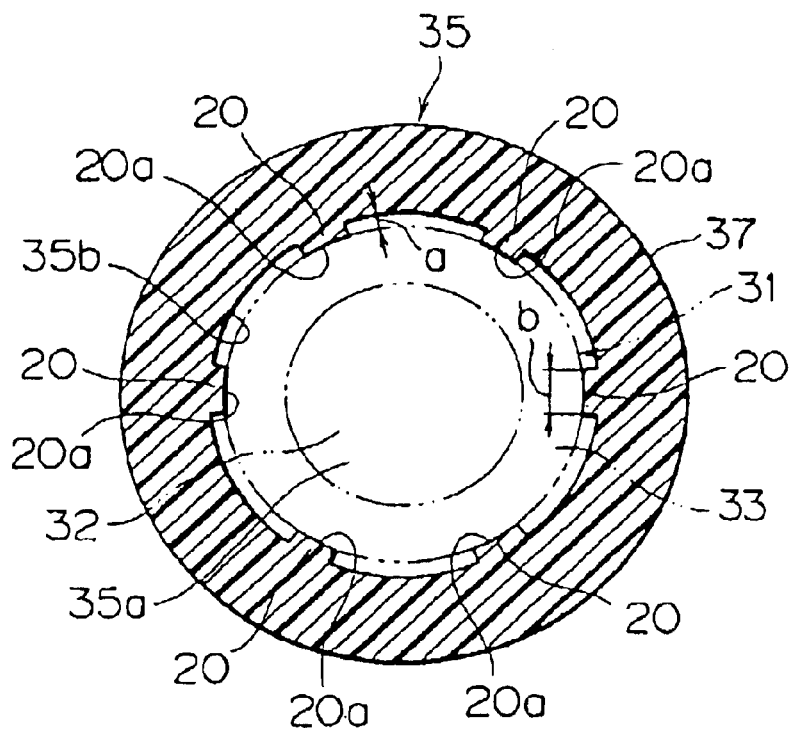
FIG. 4
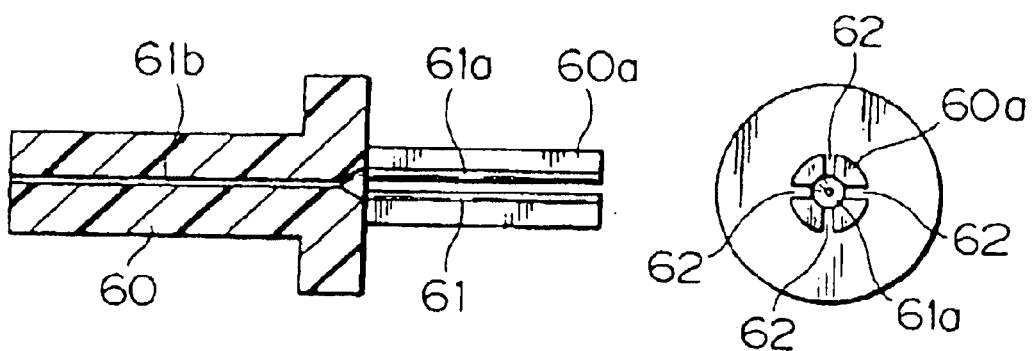
FIG. 6A
PRIOR ART
FIG. 6B
PRIOR ART

FERRULE FOR CONNECTOR OF OPTICAL FIBER AND METHOD OF WELDING FERRULE AND OPTICAL FIBER

BACKGROUND OF THE INVENTION

1. Field of the Invention

This invention relates to a ferrule for a connector of an optical fiber as a terminal component for optical communication and a method of welding the ferrule and the optical fiber for joining the terminal component and the optical fiber.

2. Description of the Related Art

Generally, methods of connecting optical fibers to each other are divided broadly into two methods: one method is permanent connecting not to allow disconnecting once connecting optical fibers together; the other method is connector connecting to allow connecting and disconnecting optical fibers freely. Permanent connecting is performed by means of welding or bonding optical fibers. Connector connecting is performed by means of fitting connectors, in which one connector may be called a plug and the other connector may be called a receptacle, together to be connected physically by abutting both end faces of optical fibers.

The connector connecting has a disadvantage of larger connecting loss of optical fiber connection cause by axis misalignment or axis tilting than the permanent connecting. However, the connector connecting has an advantage of shorter time for connecting than the permanent connecting. For this reason, the connector connecting is applied extensively to connection for short-distance optical communication systems, such as domestic digital electrical equipment, home network or car network.

An optical connector for connector connecting has an optical fiber as a communication wire and a ferrule as a terminal part. The ferrule is for positioning the optical fiber in radial direction and in axial direction, and holds one end portion of the optical fiber. A method by adhesive among many methods for joining the optical fiber and the ferrule is generally used.

The method for joining the optical fiber and the ferrule with adhesive will be described herein. The optical fiber is provided with a fiber element wire having a core wire and a cladding, and a cover portion having an inner cover and an outer cover. At the end portion of the optical fiber, the fiber element wire is exposed by means of removing the cover portion.

The ferrule is formed into tubular shape. The ferrule is provide with a through hole, formed inside thereof, having a small hole portion and a large hole portion. The small hole portion is formed so as to be inserted by the fiber element wire, and the large hole portion is formed so as to be inserted by the cover portion. The end portion of the fiber element wire inserted into the small hole portion is polished to be in the same plane as the end surface of the ferrule.

The ferrule and the optical fiber can be made of various materials, for example, quartz glass or synthetic resin. The ferrule can be also made of metal or ceramic.

The cover portion of the optical fiber is coated by adhesive and the optical fiber is inserted into the ferrule. Thereafter, the optical fiber and the ferrule are fixe together by cured adhesive.

The method for joining by adhesive requires hours to cure the adhesive by heating so that productivity of optical fibers may be reduced. Furthermore, the method for joining by adhesive has drawbacks that adhesive strength may be varied correspondingly to characteristics of surfaces of the optical fibers and the ferrules, and heat resistance of joining may be low. A method for overcoming the drawback described in the Japan Patent Application Laid Open S63-137202 is known.

The aforesaid invention, as shown in FIG. 6, is to join a ferrule 60 formed with a resin capable to be ultrasonic-welded and a not-shown optical fiber having an inner cover formed with a resin capable to be ultrasonic-welded by ultrasonic welding, and does not require tension member and operation of removing cover.

The ferrule 60 includes a through hole 61 having a large hole 61a and a small hole 61b. The through hole 61 is inserted by the end of the optical fiber removed a cover portion beforehand and the small hole 61b is inserted by the fiber element wire.

A ferrule portion 60a provided with the large hole 61a has four slits 62 extending axially for absorbing a deformed portion of the ferrule 60 by ultrasonic welding.

Objects to be Solved

However, the aforesaid method for joining the optical fiber and the ferrule for the connector of the optical fiber by prior art has following drawbacks to be solved.

When pressure force of an ultrasonic welding machine is large, the slits 62 provided at the large hole 61a of the ferrule 60 may not absorb a deformed portion of the ferrule 60 by the large pressure force. If the ferrule 60 is deformed, accuracy of aligning optical axes of optical fibers is deteriorated so that optical loss of the connection is increased and optical characteristics of the connection are deteriorated.

When contact area between the through hole 61 of the ferrule 60 and the inner cover of the optical fiber is too large against requirement for joining them, heat value by friction may be increased over requirement and the heat value by friction cannot be released. Thereby, heat-affected area in a vicinity of the joining point is increased. When heat-affected area is increased, the fiber element wire, such as crystal glass or acrylic resin, has thermal stress to cause thermal stress cracking.

When contact area between the ferrule and the optical fiber is conversely small, ultrasonic vibration may be difficultly transmitted so that heating and melting of the contact area require much time to reduce productivity of the optical connector. Furthermore, joined area is small so that, when the optical fiber is pulled, the optical fiber may be stripped out backward from the ferrule.

To overcome the above drawback of prior art, an object of this invention is to provide a ferrule for a connector of an optical fiber, which can be joined in short time with the optical fiber and can position the optical fiber securely, and a method of welding the ferrule and the optical fiber.

SUMMARY OF THE INVENTION

How to Attain the Object

In order to attain the objects, a ferrule for a connector of an optical fiber, according to the present invention, having a through hole, into which one end of said optical fiber being inserted for welding, includes a plurality of projections for ultrasonic welding, said projections being provided on an inner wall of said through hole and contacted on a surface of said optical fiber.

According to the ferrule for the connector of the optical fiber mentioned above, the optical fiber is positioned radially and axially by inserting the optical fiber into the through hole of the ferrule. The optical fiber contacts on the surface of the projection of the ferrule so that displacement of the optical fiber is prevented and ultrasonic vibration is easily transmitted. Thereby, joining force of the optical fiber and the ferrule is increased.

The ferrule for the connector of the optical fiber mentioned above is further specified by that each of the projections has a circular end face.

According to the ferrule for the connector of the optical fiber mentioned above, the circular end faces of the projections can contact securely on the surface of the optical fiber.

The ferrule for the connector of the optical fiber mentioned above is further specified by that the projection is formed into a rectangular shape or a rib shape.

According to the ferrule for the connector of the optical fiber mentioned above, a contact area of the surface of the optical fiber and each of the projections is increased so that ultrasonic vibration can be easily transmitted and secure joining force can be given. Furthermore, the ferrule can be easily ejected from a molding die and moldability of the projections is improved.

The ferrule for the connector of the optical fiber mentioned above is specified by that the plurality of said projections are disposed along a circumferential direction of the inner wall of said through hole.

According to the ferrule for the connector of the optical fiber mentioned above, the plurality of joined portions of the optical fiber and the ferrule is given so that joining force of the optical fiber and the ferrule is increased.

The ferrule for the connector of the optical fiber mentioned above is specified by that the projections are disposed at equal intervals along a circumferential direction of the inner wall of said through hole.

According to the ferrule for the connector of the optical fiber mentioned above, the optical fiber is pushed uniformly from ambience so as to be radially aligned accurately in center.

The method of welding the ferrule and the optical fiber according to the present invention includes steps of inserting the optical fiber into said ferrule for the connector of the optical fiber mentioned above, and welding said projections and said optical fiber by ultrasonic vibration for joining said ferrule and said optical fiber.

According to the method of welding the ferrule and the optical fiber mentioned above, after the optical fiber is inserted into the ferrule, the ferrule is vibrated by ultrasonic wave with pressure. Thereby, the projections formed at the through hole is heated and melted by internal friction and the optical fiber and the ferrule are welded together.

The above and other objects and features of this invention will become more apparent from the following description taken in conjunction with the accompanying drawings.

BRIEF DESCRIPTION OF THE DRAWINGS

FIG. 4 is a sectional view taking along the line A—A of the ferrule shown in FIG. 3;

FIG. 6A is a sectional view of a ferrule for a connector the optical fiber by prior art; and FIG. 6B is a right-side view of the ferrule for the connector of the optical fiber by prior art.

DESCRIPTION OF THE PREFERRED EMBODIMENT

Figures 1, 2:
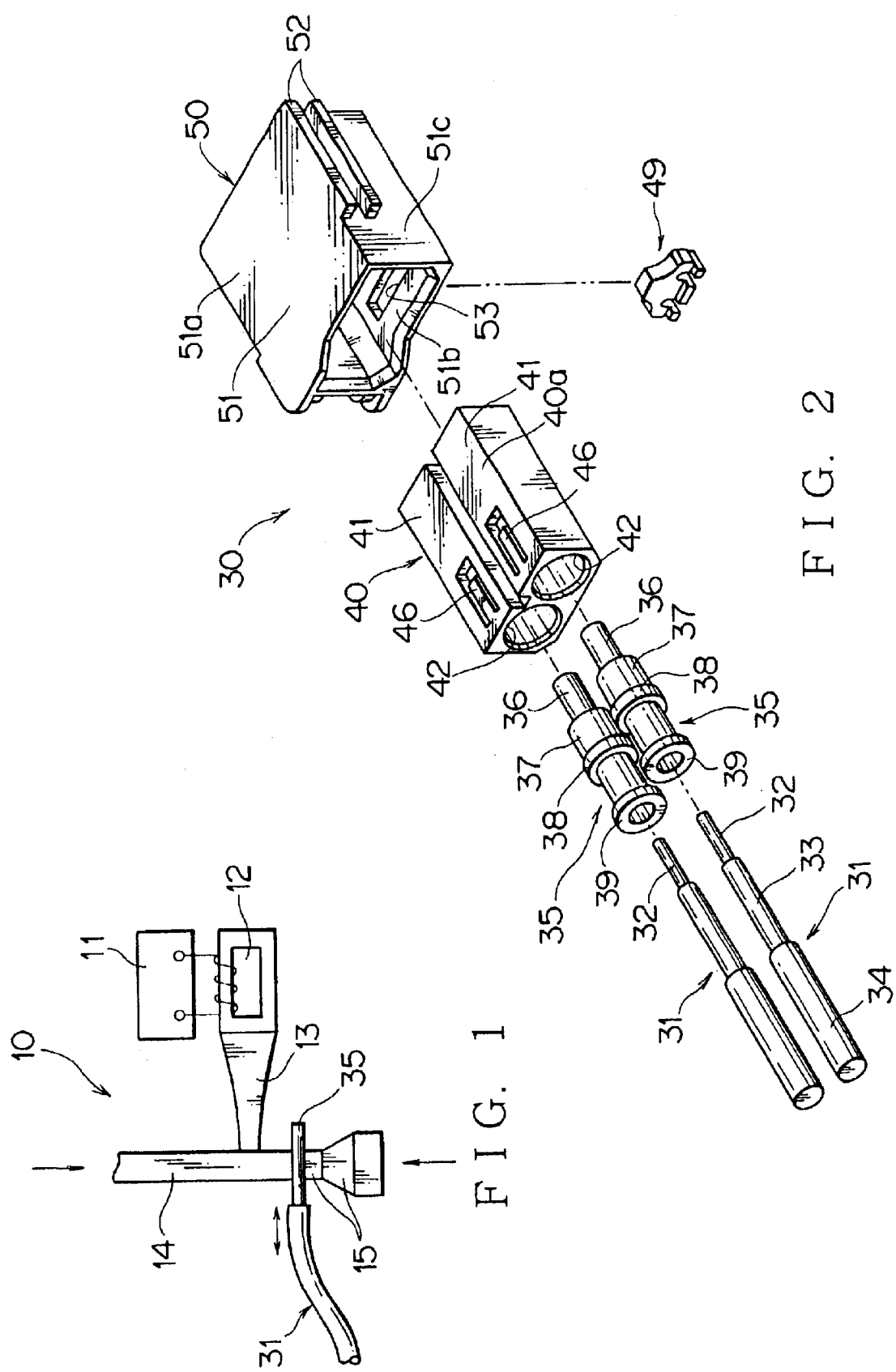
FIG. 1 is a basic diagram of an ultrasonic welding machine used for one embodiment of a method of welding a ferrule and an optical fiber according to the present invention.
FIG. 2 is an exploded perspective view of an optical connector including the ferrule for a connector of the optical fiber.

An embodiment according to the present invention will now be described with reference to drawings. FIG. 1 shows an ultrasonic welding machine used for the embodiment of the method of welding the ferrule and the optical fiber according to the present invention. FIGS. 2–5 show ferrules for the connector of the optical fiber according to the present invention.

Ultrasonic welding by ultrasonic welding machine is a method of welding two work objects by pressing two work objects and transmitting vibration energy to a contact surface therebetween to supply the vibration energy on the contact surface.

By supplying vibration energy on objects, heat is generated by slip between the objects and internal friction of the objects, and the contact surfaces of the objects are melted partially and atomic elements at the contact surface of the objects are diffused. Thereby, two work objects are completely joined together. Heat-affected area in a vicinity of the joining point by ultrasonic welding is small. Therefore, ultrasonic welding is suitable to weld thin sheet, such as electronic components, and welding operation is completed within a few seconds.

An ultrasonic welding machine 10, as shown in FIG. 1, has an ultrasonic oscillator 11, a transducer 12, a horn 13, a tip 14, an anvil 15 and a not-shown hydraulic device. These components will be explained as follows.

The ultrasonic oscillator 11 can generate normally electric power of from 100 watts to 10K watts. The transducer 12 is a magnetostrictive vibrator of ferromagnetic material disposed in a magnetic field for generating vibration energy by electric energy from the ultrasonic oscillator 11. The horn 13 is to transmit vibration from the transducer 12 to the tip 14. The horn 13 is disposed horizontally in FIG. 1. However, the horn 13 may be disposed vertically to change a direction.

The tip 14 and the anvil 15 are respectively an upper tool and a lower tool for clamping a ferrule 35 as a work object. The hydraulic device is for pressing the tip 14 and/or the anvil 15. By providing a motor in the ultrasonic welding machine 10, the ferrule 35 can be rotated between the tip 14 and the anvil 15. Instead of the tip 14 and the anvil 15, a chuck can be disposed and vibrated by the horn.

One operating condition of the ultrasonic welding machine 10 structured above is set up by output ultrasonic power of 2K watts, ultrasonic frequency of 15–39 KHz, ultrasonic amplitude (amplitude of horn vertical vibration) of 40–50 micron and clamping pressure by the tip 14 and the anvil 15 of 300–500 N.

In condition of clamping the ferrule 35 inserted by an optical fiber 31 between the tip 14 and the anvil 15, and pressing the ferrule 35 vertically, the ferrule 35 and the optical fiber 31 are welded by vibrating the tip 14 horizontally by the horn 13. The horn may be disposed vertically and vibrated vertically by ultrasonic wave.

FIG. 2 shows an exploded perspective view of an optical connector 30. The optical connector 30 includes the optical fiber 31, the ferrule 35, an optical adapter 40 and an optical adapter cover 50. Each component will be explained as follows.

The optical fiber 31 has a fiber element wire 32, an inner cover 33 for covering the fiber element wire 32 and an outer cover 34 for covering outside of the inner cover 32. The fiber element wire 32 is made of synthetic resin, i.e. a plastic fiber element wire. The fiber element wire 32 is formed with a core material, such as PMMA (poly-methyl methacrylate, commonly known by acrylic resin) having high light transmittance or polycarbonate (PC) having heat resistance, and a clad material such as fluoride resin.

A core disposed at the center of the fiber element wire 32 is a wave guide wire (transmission line) for transmitting optical signals. A cladding provided on outside of the core is made of material having smaller refractive index than that of the core. Thereby, light is reflected on a boundary surface of the core and the cladding so as to be limited in the core.

The inner cover 33 and the outer cover 34 are made of synthetic resin having insulating properties and flame retardance, for example, polyethylene resin, polyvinylchloride or nylon.

The inner cover 33 and the outer cover 35 are removed one after another from an end of the optical fiber 31 so as to expose the fiber element wire with a predetermined length. The inner cover 33 is exposed with a predetermined length from an end of the outer cover 34 so as to be joined with the ferrule 35 by heating and melting the inner cover 34 by ultrasonic vibration.

Figure 3:
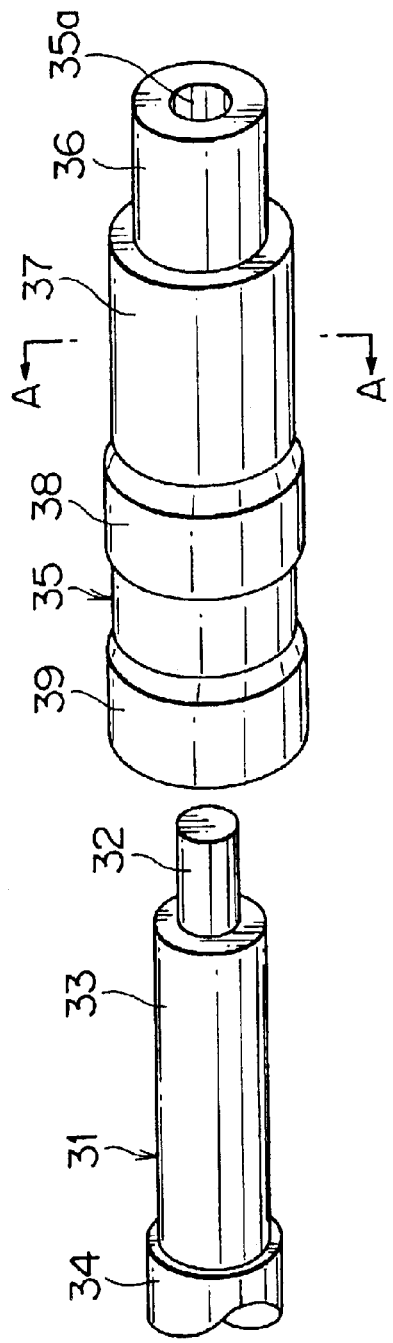
FIG. 3 is an expanded perspective view of the ferrule shown in FIG. 2.

The ferrule 35 is made of synthetic resin, i.e. a plastic ferrule. The ferrule 35, as shown in FIG. 3, is formed into stepped cylindrical shape with a small diameter portion 36 for receiving the fiber element wire 32 into a through hole 35a of the small diameter portion 36 and a large diameter portion 37 continuous to the small diameter portion 36 for receiving the inner cover 33 into the through hole 35a. The fiber element wire 32 is inserted into the through hole 35a so as to expose the fiber element wire 32 from an end portion of the small diameter portion 36. Thereafter, the end of the fiber element wire 32 is polished together with the ferrule 35 so as to face an end of the ferrule 35 receiving the optical fiber.

A first flange 38 and a second flange 39 are formed respectively into ring shape on a body of the large diameter portion 37. The first flange 38 is disposed at a middle of the large diameter portion 37 and the second flange 39 is disposed at a end of the large diameter portion 37.

In FIG. 2, the optical adapter 40 is made of synthetic resin and is formed integrally with two bodies 41 having rectangular outer shape to be disposed juxtapositionaly. In the two bodies 41, 41 formed plane-symmetrically to each other, an insert opening 42, a receiving section 43 (FIG. 5) and a connection opening 44 (FIG. 5) are disposed along lengthwise of the optical adapter 40.

The insert opening 42 is a round through hole for inserting the end of the optical fiber 31 and provided at one end surface of lengthwise of the optical adapter 40. Diameter of the insert opening 42 is slightly larger than diameter of the first flange 38 and the second flange 39 of the ferrule 35.

The receiving section 43 is formed longer than the length of the ferrule 35 so as to prevent the received ferrule 35 from projecting from the connection opening 44. Thereby, the both ends of the ferrule 35 and the optical fiber 31 are guarded against scratching or damaging. The receiving section 43 is formed to have the same diameter of the insert opening 42 and the connection opening 44, and provided along circumferential direction at middle of the receiving section 43 with a ring-shaped stopper 45 (FIG. 5) projecting inwardly. The first flange 38 of the ferrule 35 abuts on the stopper 45 to position the ferrule 35 along lengthwise.

The connection opening 44 is provided at the other end surface of lengthwise of the optical adapter 40. The connection opening 44 is a round through hole for inserting not-shown mating optical connector.

Figure 5:
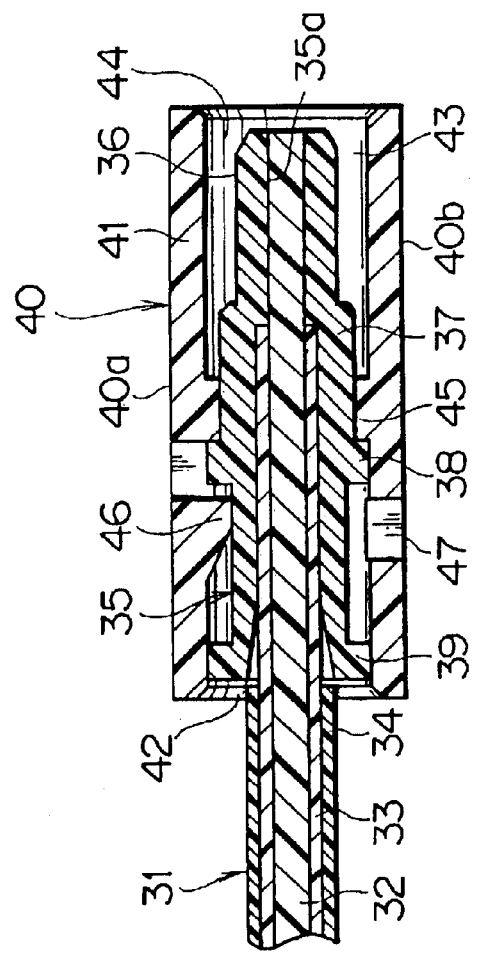
FIG. 5 is a sectional view of the ferrule, inserted by the end of the optical fiber, fitting with the optical adapter shown in FIG. 2.

The optical adapter 40 is provided with a lock portion 46 at a top wall 40a thereof and an engage portion 47 at a bottom wall 40b (FIG. 5). The lock portion 46 is a flexible lock piece disposed close to the insert opening 42 from the center of the optical adapter 40. The lock portion 46 engages with the first flange 38 of the ferrule 35 so as to prevent the ferrule 35 from stripping out backwardly.

The engage portion 47 (FIG. 5) is formed to communicate to the receiving section 43. A holder 49 is inserted into the engage portion 47 so as to be engaged with the first flange 38 of the ferrule 35 for locking doubly the ferrule 35.

The optical adapter cover 50 is made of synthetic resin and formed into frame shape so as to receive the optical adapter 40 inside thereof. The optical adapter cover 50 includes a rear wall and an enclosing wall 51 continuous to the rear wall. The enclosing wall 51 has a top wall 51a, a bottom wall 51b and both side walls 51c, 51c (one side wall is shown).

The bottom wall 51b of the optical adapter cover 50 is provided with an engaging opening 53 corresponding to the holder 49. The engaging opening 53 is formed to have substantially same size of the engage portion 47 (FIG. 5). When the holder 49 is inserted into the engaging hole 53, the holder 49 engages through the engaging hole 53 with the first flange 38 of the ferrule 35.

FIG. 5 shows the ferrule 35, in which the end of the optical fiber 31 is inserted, fitting with the optical adapter 40. The optical fiber is inserted from a rear end of the ferrule 35 and the outer cover 39 of the optical fiber 31 is abutted on an end portion of the second flange 39. Thereby, the optical fiber 31 is positioned along lengthwise thereof.

The inserted fiber element wire 32 is fitted on an inner wall of the through hole 35a so as to position radially an optical axis of the fiber element wire accurately. Furthermore, the optical axis is positioned without a tilt.

The ferrule 35 is positioned by abutting on the stopper 45 of the optical adapter 40. The first flange 38 of the ferrule 35 is engaged with the lock portion 46 to prevent the ferrule 35 from stripping out toward the opposite direction of insertion.

FIG. 4 is a sectional view taken along the line A—A of the ferrule shown in FIG. 3. A feature of the present invention is that a plurality of projections 20 is disposed on the inner wall 35b of the through hole 35 to be inserted by the inner cover 33 of the optical fiber 31.

The projections 20 are extended axially with rib shape and disposed at equal intervals along a circumferential direction of the inner wall. In this embodiment, six projections 20 are disposed at axial-symmetrical positions. The optical fiber 31 is pressed uniformly from ambience to prevent the optical fiber 31 from displacing when the optical fiber 31 is ultrasonic-welded. The number of the projections 20 may be more than six. The projection 20 may be a rectangular shape projection to project from the inner wall 35b of the through hole 35a. The rectangular shape includes square shape herein.

Projecting length "a" of each of the projections 20 is designed to contact an end face of the projection 20 with the inner cover 33 of the optical fiber 31. When the projecting length "a" is longer, the projections 20 obstruct to insert the optical fiber 31. When the projecting length "a" is shorter, the projections 20 cannot transmit ultrasonic vibration to the optical fiber 31.

An end face 20a of the projection 20 is formed into a concave circular shape so as to contact with the surface of the inner cover 33 of the optical fiber 31. Thereby, contact area of the optical fiber 31 and the ferrule 35 is increased so that ultrasonic vibration is transmitted securely from the ferrule 35 to the optical fiber 31. Furthermore, the optical fiber is accurately positioned radially and axially.

A width "b", along a circumferential direction of the inner wall of the through hole, of each of the projections 20 is defined by a relation of a pressure force of the ultrasonic welding machine 10 shown in FIG. 1 and contact area. The pressure force is a vertical force to be loaded on the ferrule 35 through the tip 14 and/or the anvil 15 by the hydraulic device. The contact area is a contact boundary area of the end face 20a of the projection 20 and the inner cover 33 of the optical fiber 31.

The joining force between the optical fiber 31 and the ferrule 35 by ultrasonic welding depends on a ratio of the pressure force to the contact area (call contact pressure force hereafter). When the contact pressure force is too large, the ferrule 35 and the optical fiber 31 may be deformed. When the contact pressure force is too small, it requires much time to heat and melt a contact boundary portion of the optical fiber 31 and the ferrule 35 so that the joining force may be decreased.

Therefore, the width "b" of the projection 20 is determined not to deform the ferrule 35 and spend much time for heating and melting the contact boundary portion and decrease the joining force.

Operation for ultrasonic-welding the optical fiber 31 and the ferrule 35 has steps of inserting the end of the optical fiber 31 removed the outer cover 34 and the inner cover 33 beforehand into the through hole 35a of the ferrule 35, applying ultrasonic vibration on the ferrule 35 with pressure by the ultrasonic welding machine 10, rubbing the end faces 20a of the projections 20 on the through hole 35a with the inner cover 33 of the optical fiber 31, heating and melting the projections 20 and the inner cover 33 by internal friction, and welding the optical fiber 31 and the ferrule 35.

According to this embodiment, the projections 20 to contact with the surface of the optical fiber 31 for ultrasonic welding are disposed on the inner wall 35b of the through hole 35a so that, by contacting the optical fiber 31 with the end faces of the projections 20, the optical fiber 31 is prevented from displacing and ultrasonic vibration is securely transmitted to increase joining force between the optical fiber 31 and the ferrule 35.

The end face 20a of each of the projections 20 is formed into a circular shape so that the contact area of the optical fiber 31 and the ferrule 35 is increased and ultrasonic vibration is securely transmitted.

Furthermore, each of the projections 20 is formed into a rib shape so that the contact area of the optical fiber 31 and the ferrule 35 is more increased and ultrasonic vibration is more securely transmitted.

Six projections 20 are disposed so that the optical fiber 31 is prevented from displacing by increasing the pressing force and the joining force is increased by increasing contact area. Furthermore, the projections 20 are disposed at equal intervals along a circumferential direction of the inner wall so that the optical fiber 31 is pressed uniformly from ambience and radially aligned accurately in center.

Having now fully described the invention, it will be apparent to one of ordinary skill in the art that many changes and modifications can be made thereto without departing from the scope of the invention as set forth herein.

What is claimed is:

1. A ferrule for a connector of an optical fiber, having a through hole, into which one end of said optical fiber being inserted for welding, comprising:

a plurality of projections for ultrasonic welding, said projections being provided on an inner wall of said through hole and contacted on a surface of said optical fiber, wherein
a width of said projections is set in dependence upon a relationship of a contact area and a pressure force of an ultrasonic welding machine, the contact area being a contact boundary area of end faces of said projections and the surface of said optical fiber, the pressure force being a vertical force loaded on the ferrule, the width being measured along a circumferential direction of the inner wall.

2. The ferrule for the connector of the optical fiber according to claim 1, wherein each of said projections has a circular end face.

3. The ferrule for the connector of the optical fiber according to claim 1 or 2, wherein each of said projections is formed into a rectangular shape or a rib shape.

4. The ferrule for the connector of the optical fiber according to claim 1, wherein the plurality of projections are disposed along a circumferential direction of the inner wall of said through hole.

5. The ferrule for the connector of the optical fiber according to claim 4, wherein said projections are disposed at equal intervals along a circumferential direction of the inner wall of said through hole.

6. A method of welding the ferrule and the optical fiber comprising steps of:

inserting the optical fiber into said ferrule for the connector of the optical fiber according to claim 1 or 2; and welding said projections and said optical fiber by ultrasonic vibration for joining said ferrule and said optical fiber.

* * * * *